US011804334B2

(12) United States Patent
Tsubaki et al.

(10) Patent No.: US 11,804,334 B2
(45) Date of Patent: *Oct. 31, 2023

(54) ELECTROLYTIC CAPACITOR COMPRISING AN ANODE BODY, A CATHODE BODY AND A CONDUCTIVE POLYMER AND A LIQUID COMPONENT DISPOSED BETWEEN THE ANODE BODY AND THE CATHODE BODY

(71) Applicant: Panasonic Intellectual Property Management Co., Ltd., Osaka (JP)

(72) Inventors: Yuichiro Tsubaki, Kyoto (JP); Kazuyo Saito, Osaka (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,958

(22) Filed: Aug. 22, 2022

(65) Prior Publication Data

US 2022/0399170 A1 Dec. 15, 2022

Related U.S. Application Data

(63) Continuation of application No. 16/706,615, filed on Dec. 6, 2019, now Pat. No. 11,456,120.

(30) Foreign Application Priority Data

Dec. 28, 2018 (JP) ................................ 2018-247077

(51) Int. Cl.
*H01G 9/035* (2006.01)
*H01G 9/145* (2006.01)
(Continued)

(52) U.S. Cl.
CPC ............. *H01G 9/035* (2013.01); *H01G 9/145* (2013.01); *H01G 9/151* (2013.01)

(58) Field of Classification Search
CPC ............................... H01G 9/145; H01G 9/035
See application file for complete search history.

(56) References Cited

U.S. PATENT DOCUMENTS 6,307,735 B1  10/2001  Saito et al.
6,962,612 B1  11/2005  Saito et al.
(Continued)

FOREIGN PATENT DOCUMENTS

JP     11-283874       10/1999
JP   2003-282367 A   10/2003
(Continued)

OTHER PUBLICATIONS

Non-Final Office Action issued in U.S. Appl. No. 16/706,615, dated Dec. 10, 2021.

(Continued)

*Primary Examiner* — David M Sinclair
(74) *Attorney, Agent, or Firm* — McDermott Will & Emery LLP

(57) ABSTRACT

An electrolytic capacitor includes an anode body, a cathode body, and a conductive polymer and a liquid component that are disposed between the anode body and the cathode body. The liquid component contains an acid component, a base component, and an aromatic additive. The acid component includes at least one of an aromatic carboxylic acid and an aromatic carboxylic acid derivative. The at least one of the aromatic carboxylic acid and the aromatic carboxylic acid derivative includes at least two carboxy groups and at least one aromatic ring. A content proportion of the base component in the liquid component is more than or equal to 1% by mass. The aromatic additive includes an electron withdraw- (Continued)

ing group and an electron donating group. A content ratio of the aromatic additive contained in the liquid component is more than or equal to 50 parts by mass with respect to 100 parts by mass of the conductive polymer.

9 Claims, 2 Drawing Sheets

(51) Int. Cl.
*H01G 9/028* (2006.01)
*H01G 9/15* (2006.01)

(56) References Cited

U.S. PATENT DOCUMENTS

| | | | |
|---|---|---|---|
| 11,456,120 B2 * | 9/2022 | Tsubaki | H01G 9/145 |
| 2008/0316679 A1 | 12/2008 | Sugihara et al. | |
| 2009/0034160 A1 | 2/2009 | Takeda et al. | |
| 2012/0300368 A1 | 11/2012 | Matsuura et al. | |
| 2014/0334066 A1 | 11/2014 | Sugihara et al. | |
| 2018/0158619 A1 | 6/2018 | Tsubaki et al. | |
| 2018/0197685 A1 | 7/2018 | Tsubaki et al. | |

FOREIGN PATENT DOCUMENTS

| | | | |
|---|---|---|---|
| JP | 5259895 B | 8/2013 | |
| JP | 2016-021453 | 2/2016 | |
| JP | 2017-147466 A | 8/2017 | |
| JP | 2018-110233 A | 7/2018 | |
| WO | 2013/094462 | 6/2013 | |
| WO | WO-2015114931 A1 * | 8/2015 | H01G 9/035 |
| WO | 2017017947 A1 | 2/2017 | |
| WO | 2017056447 A1 | 4/2017 | |

OTHER PUBLICATIONS

Notice of Allowance issued in U.S. Appl. No. 16/706,615, dated May 27, 2022.

* cited by examiner

ELECTROLYTIC CAPACITOR COMPRISING AN ANODE BODY, A CATHODE BODY AND A CONDUCTIVE POLYMER AND A LIQUID COMPONENT DISPOSED BETWEEN THE ANODE BODY AND THE CATHODE BODY

CROSS-REFERENCE TO RELATED APPLICATIONS

This application is a Continuation Application of U.S. patent application Ser. No. 16/706,615, filed on Dec. 6, 2019, which claims the benefit of Japanese Application No. 2018-247077, filed on Dec. 28, 2018, the disclosures of which are incorporated herein by reference.

BACKGROUND

1. Technical Field

The present disclosure relates to an electrolytic capacitor having a conductive polymer and a liquid component.

2. Description of the Related Art

As a small sized, large capacitance, and low equivalent series resistance (ESR) capacitors, promising candidates are electrolytic capacitors including an anode body on which a dielectric layer is formed, a conductive polymer formed so as to cover at least a part of the dielectric layer, and a liquid component.

For example, WO2013/94462 discloses an electrolytic capacitor including a conductive polymer and a conductive auxiliary liquid. In WO2013/94462, it is preferred to decrease a conductivity of the conductive auxiliary liquid, and the conductive auxiliary liquid contains an organic solvent having a boiling point of 150° C. or higher and an aromatic compound having at least one hydroxyl group. It is described in WO2013/94462 that the aromatic compound having at least one hydroxyl group has ability to assist electronic conduction of the conductive polymer, and can prevent degradation of the conductive polymer by its antioxidant action.

SUMMARY

An electrolytic capacitor according to one aspect of the present disclosure includes an anode body including a dielectric layer, a cathode body, a conductive polymer, and a liquid component. The conductive polymer and the liquid component are disposed between the anode body and the cathode body. The liquid component contains an acid component, a base component, and an aromatic additive. The acid component includes at least one of an aromatic carboxylic acid and an aromatic carboxylic acid derivative. The at least one of the aromatic carboxylic acid and the aromatic carboxylic acid derivative includes at least two carboxy groups and at least one aromatic ring. A content proportion of the base component in the liquid component is more than or equal to 1% by mass. The aromatic additive includes an electron withdrawing group and an electron donating group. A content ratio of the aromatic additive contained in the liquid component is more than or equal to 50 parts by mass with respect to 100 parts by mass of the conductive polymer.

According to the present disclosure, it is possible to provide an electrolytic capacitor capable of increasing an electrostatic capacity and maintaining low ESR even in high-temperature environments.

DETAILED DESCRIPTION OF EMBODIMENT

Figure 1:
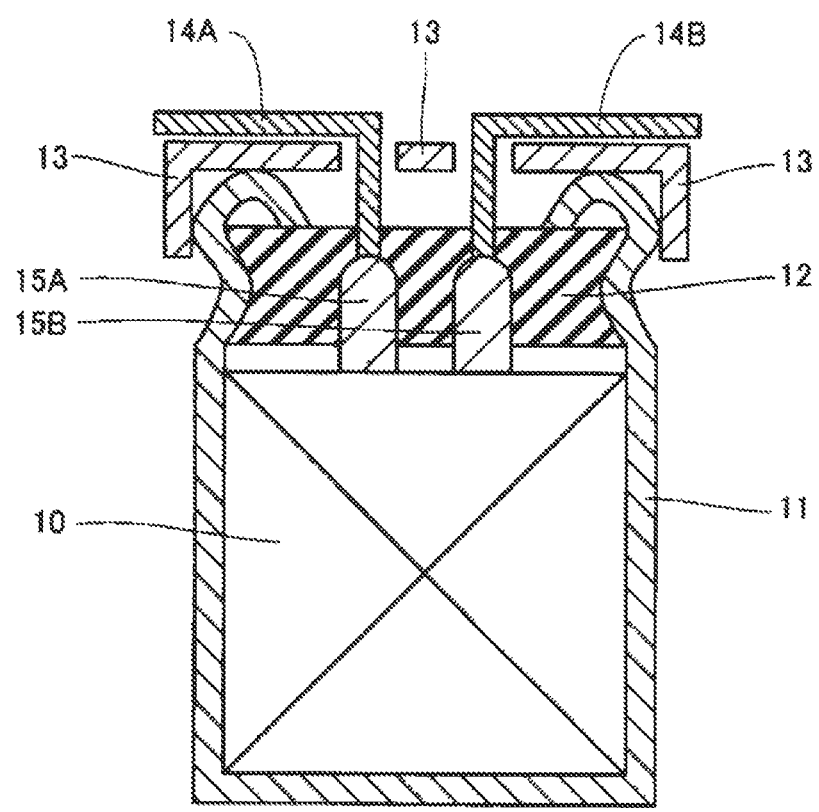
FIG. 1 is a cross-sectional schematic view illustrating an electrolytic capacitor according to one exemplary embodiment of the present disclosure.

Prior to describing an exemplary embodiment of the present disclosure, problems found in a conventional technique will now be briefly described herein. In an electrolytic capacitor having a conductive polymer and a liquid component, the liquid component sometimes contains an acid component and a base component. For example, the acid component acts to prevent degradation of the conductive polymer. The base component acts to increase a degree of dissociation of the acid component and thus enhance conductivity of an electrolyte solution. Consequently, it is considered that these components increase an electrostatic capacity of the electrolytic capacitor.

Meanwhile, the acid component tends to gradually decrease due to an esterification reaction in high-temperature environments of, for example, 125° C. or higher. In addition, the base component facilitates the degradation of the conductive polymer in some cases. If the conductive polymer is degraded, it is difficult to maintain low ESR of the electrolytic capacitor.

An electrolytic capacitor according to the present disclosure includes an anode body including a dielectric layer, a cathode body, and a conductive polymer and a liquid component. The conductive polymer and the liquid component are disposed between the anode body and the cathode body. The liquid component contains an acid component, a base component, and an aromatic additive. The acid component includes at least one of an aromatic carboxylic acid and an aromatic carboxylic acid derivative. The at least one of the aromatic carboxylic acid and the aromatic carboxylic acid derivative includes at least two carboxy groups and at least one aromatic ring. A content proportion of the base component in the liquid component is more than or equal to 1% by mass. The aromatic additive includes an electron withdrawing group and an electron donating group. A content ratio of the aromatic additive contained in the liquid component is more than or equal to 50 parts by mass with respect to 100 parts by mass of the conductive polymer.

The conductive polymer is, for example, a π-conjugated conductive polymer, and is usually doped with a dopant for the purpose of enhancing conductivity. Since the liquid component contains the acid component, dedoping of the dopant is suppressed. Consequently, it is considered that the degradation of the conductive polymer or a decrease in conductivity is suppressed.

Meanwhile, the base component is assumed to act to increase the degree of dissociation of the acid component and enhance the conductivity of the liquid component, accordingly. However, the base component also acts to facilitate dedoping of the dopant from the conductive polymer. Consequently, it is preferable to control a composition of the liquid component so that the base component is not excessive.

Among acid components, an aromatic carboxylic acid and an aromatic carboxylic acid derivative (hereinafter, aromatic carboxylic acid and aromatic carboxylic acid derivative are collectively referred to as "aromatic carboxylic acids") are relatively stable. In particular, aromatic carboxylic acids having at least two carboxyl groups and at least one aromatic ring are relatively stable to the esterification reaction. In view of suppressing an increase in viscosity of the liquid component, the aromatic carboxylic acids preferably have at least one of C6 benzene ring and C10 naphthyl ring, or at least two of C6 benzene ring and C10 naphthyl ring.

As the aromatic carboxylic acid, divalent to quadrivalent carboxylic acids are preferred because they are more stable. It is preferable that two or more carboxyl groups are directly bonded to ortho positions of an aromatic ring with each other. Specifically, phthalic acid, pyromellitic acid, and the like may be used as the aromatic carboxylic acid. In particular, the phthalic acid is preferred, and o-phthalic acid is more preferred.

As the aromatic carboxylic acid derivative, condensates of a carboxylic acid and an inorganic acid (for example, boric acid and phosphoric acid) are preferred because they are stable. A condensate of a carboxylic acid and a boric acid is preferred, for example. Specifically, borodisalicylic acid, borodiglycolic acid, borodioxalic acid, and the like may be used.

A content proportion of aromatic carboxylic acids in the liquid component is more than or equal to 1.0% by mass, for example, and is preferably more than or equal to 2.0% by mass. Further, the content proportion of aromatic carboxylic acids in the liquid component is less than or equal to 40% by mass, and is preferably less than or equal to 20% by mass.

A content ratio of the acid component contained in the liquid component is more than or equal to 100 parts by mass, for example, and is preferably more than or equal to 130 parts by mass with respect to 100 parts by mass of the base component. Further, the content ratio of the acid component contained in the liquid component is less than or equal to 700 parts by mass, for example, and is preferably less than or equal to 500 parts by mass with respect to 100 parts by mass of the base component.

The base component is preferably at least one selected from the group consisting of a primary amine, a secondary amine, and a tertiary amine. Use of amine components (particularly, primary to tertiary amines) enhances an effect of stabilizing ESR for a long period of time. A quaternary amine may be used. In view of preventing a side reaction as much as possible, however, the primary to tertiary amines are preferably used. As each of the amines, an aliphatic amine, an aromatic amine, a heterocyclic amine, and the like can be used. However, aliphatic amines having a molecular weight of 72 to 102 (inclusive) are preferred in view of high degree of dissociation.

Examples of the primary to tertiary amines include methylamine, dimethylamine, trimethylamine, ethylamine, diethylamine, triethylamine, ethylenediamine, N, N-diisopropylethyl amine, tetramethylethylene diamine, hexamethylene diamine, spermidine, spermine, amantadine, aniline, phenethylamine, toluidine, pyrrolidine, piperidine, piperazine, morpholine, imidazole, pyridine, pyridazine, pyrimidine, pyrazine, and 4-dimethylaminopyridine. These materials may be used alone or in combination of two or more thereof. In particular, tertiary amines such as triethylamine and monoethyldimethylamine are preferred.

At least a part of the aromatic carboxylic acid may be derived from a salt of the aromatic carboxylic acid and the base component. That is to say, the liquid component may contain a salt of the aromatic carboxylic acid and the base component as the acid component and the base component.

Even in relatively stable aromatic carboxylic acids described above, the esterification reaction gradually proceeds in high-temperature environments of approximately 125° C. As a result, a content of the acid component gradually decreases. Meanwhile, the base component contained in the liquid component does not decrease due to the esterification reaction. Moreover, to sufficiently enhance the conductivity of the liquid component and increase electrostatic capacity, the content proportion of the base component in the liquid component is preferably high, for example, more than or equal to 1% by mass. The content proportion of the base component in the liquid component is preferably more than or equal to 1.4% by mass, and more desirably more than or equal to 1.8% by mass. When an aromatic additive is not used, dedoping of the dopant from the conductive polymer may accelerate.

When the aromatic additive is used, dedoping of the dopant from the conductive polymer is suppressed in high-temperature environments. Since the aromatic additive includes an electron withdrawing group and an electron donating group, the electron donating group may exhibit acidity. On the other hand, the electron withdrawing group acts to stabilize the electron donating group, which exhibit acidity. Consequently, when a sufficient amount of the aromatic additive for the conductive polymer is present, acceleration of dedoping due to the base component is considered to be mitigated. In addition, the electron donating group of the aromatic additive is relatively stable to the esterification reaction. Consequently, it is considered that the amount of the aromatic additive is unlikely to decrease, and an action of suppressing dedoping of the dopant from the conductive polymer (hereinafter, referred to as "dedoping suppression action") is maintained in high-temperature environments.

However, when the content proportion of the base component in the liquid component exceeds, for example, 10.0% by mass, the dedoping suppression action may not be performed effectively. It is thus preferable that the content proportion of the base component in the liquid component is less than or equal to 10.0% by mass.

The sufficient amount for the conductive polymer means that the content ratio of the aromatic additive contained in the liquid component is more than or equal to 50 parts by mass with respect to 100 parts by mass of the conductive polymer. When the content ratio of the aromatic additive contained in the liquid component is less than 50 parts by mass with respect to 100 parts by mass of the conductive polymer, the dedoping suppression action is not effectively achieved. The aromatic additive is stable and exhibits acidity, but the acidity of the aromatic additive is weak. For this reason, a sufficient amount of the aromatic additive with respect to the mass of the conductive polymer needs to be contained in the liquid component. The content ratio of the aromatic additive contained in the liquid component is preferably more than or equal to 100 parts by mass, and more preferably more than or equal to 150 parts by mass with respect to 100 parts by mass of the conductive polymer. However, when the aromatic additive is excessive, the conductivity of the liquid component decreases and low-temperature and low-frequency capacitance characteristics also decrease accordingly. Hence, the content ratio of the aromatic additive is preferably less than or equal to 1,000 parts by mass or less than or equal to 800 parts by mass, with respect to 100 parts by mass of the conductive polymer.

The content proportion of the aromatic additive in the liquid component is more than or equal to 1% by mass, for example, and is preferably more than or equal to 2% by mass.

A number of electron withdrawing groups directly bonded to the aromatic ring of the aromatic additive ranges from 1 to 3, inclusive, for example. Examples of the electron withdrawing group include a nitro group, a carboxy group, a phenyl group, an acyl group, a tosyl group, a keto group, a cyano group, a methylsulfonyl group, and a halogen group. When the aromatic additive has two or more electron withdrawing groups, the two or more electron withdrawing groups may be the same or may be different from each other.

The number of electron donating groups directly bonded to the aromatic ring of the aromatic additive ranges from 1 to 3, inclusive, for example. Examples of the electron donating group include a hydroxy group, an amino group, an alkyl group, an alkoxy group, and an ester group. When the aromatic additive has two or more electron donating groups, the two or more electron donating groups may be the same or may be different from each other.

Specific examples of the aromatic additive include, but are not limited to, (p-, m-, o-) nitrophenol, dinitrophenol, trinitrophenol, (p-, m-, o-) hydroxybenzenecarboxylic acid, dihydroxybenzenecarboxylic acid, (p-, m-, o-) acetylphenol, (p-, m-, o-) benzoylphenol, and (p-, m-, o-) methylsulfonylphenol. These aromatic additives may be used alone or in combination of two or more thereof.

A solvent that is mixed with the acid component, the base component, and the aromatic additive is not particularly limited. However, in view of improving heat resistance of the electrolytic capacitor, it is preferable to use at least a polymer solvent. Examples of the polymer solvent include polyalkylene glycols such as polyethylene glycol and polypropylene glycol, polyglycerins, and ethers thereof with alkylated ends. In particular, the molecular weight of polyethylene glycol ranges from 190 to 400, inclusive, for example, and may range from 200 to 300, inclusive.

The content proportion of the polymer solvent in the liquid component is more than or equal to 0.5% by mass, for example, may be more than or equal to 1% by mass, and is preferably more than or equal to 20% by mass. Further, the content proportion of the polymer solvent in the liquid component may be less than or equal to 90% by mass.

The liquid component may contain, as a solvent, low molecular weight glycol compounds such as ethylene glycol, diethylene glycol, triethylene glycol, and propylene glycol, and glycerin. The low molecular weight glycol compounds or glycerin are assumed to increase orientation of the conductive polymer, enhance conductivity, and reduce ESR. In particular, ethylene glycol is preferred because of relatively low viscosity, high thermal conductivity, and excellent heat dissipation.

The content proportion of ethylene glycol in the liquid component is more than or equal to 3.0% by mass, for example, and is preferably more than or equal to 10% by mass. Further, the content proportion of ethylene glycol in the liquid component may be less than or equal to 90% by mass.

The liquid component may contain, as the solvent, a sulfone compound, a lactone compound, a carbonate compound, and the like in addition to the polymer solvent and the low molecular weight glycol compound described above. As the sulfone compound, sulfolane, dimethyl sulfoxide, diethyl sulfoxide, and the like may be used. As the lactone compound, γ-butyrolactone, γ-valerolactone, and the like may be used. As the carbonate compound, dimethyl carbonate (DMC), diethyl carbonate (DEC), ethyl methyl carbonate (EMC), ethylene carbonate (EC), propylene carbonate (PC), fluoroethylene carbonate (FEC), and the like may be used. These compounds may be used alone or in combination of two or more types thereof.

The liquid component may contain an aromatic compound that has only an electron donating group in view of maintaining low ESR of the electrolytic capacitor for a longer period of time. As such an aromatic compound, for example, phenol, dibutylhydroxytoluene, cresol, methoxyphenol, eugenol, guaiacol, thymol, catechol, and pyrogallol may be used. In particular, divalent to quadrivalent phenol compounds having two to four phenol hydroxyl groups are preferred. Specifically, catechol and/or pyrogallol may be used.

The content proportion of the aromatic compound that has only the electron donating group in the liquid component ranges from 0.1% by mass to 30% by mass, inclusive, for example, and may range from 2% by mass to 25% by mass, inclusive.

A pH of the liquid component is preferably less than or equal to 6, more preferably less than or equal to 4, and further preferably less than or equal to 3.8 or less than or equal to 3.6. When the pH of the liquid component is less than or equal to 4, degradation of the conductive polymer is further suppressed.

The conductive polymer may be synthesized by a method of applying a solution containing a monomer, a dopant, an oxidant, and the like to a dielectric layer to cause chemical polymerization or electrolytic polymerization on the dielectric layer. Alternatively, a conductive polymer synthesized in advance may be applied to the dielectric layer. In this case, for example, the dielectric layer is impregnated with a liquid polymer dispersion containing the conductive polymer and a polymer dopant so that a conductive polymer film is formed to cover at least a part of the dielectric layer.

The conductive polymer is preferably polypyrrole, polythiophene, polyaniline, or the like. These conductive polymers may be used alone, or two or more of these conductive polymers may be used in combination, or a copolymer of two or more monomers may be used. In the present specification, polypyrrole, polythiophene, polyaniline, and the like mean polymers having, as a basic skeleton, polypyrrole, polythiophene, polyaniline, and the like, respectively. Consequently, polypyrrole, polythiophene, polyaniline, and the like may also include derivatives of polypyrrole, polythiophene, polyaniline, and the like, respectively. For example, polythiophene includes poly(3,4-ethylenedioxythiophene) (PEDOT) and the like. A weight-average molecular weight of the conductive polymer is not particularly limited and ranges, for example, from 1,000 to 100,000, inclusive.

It is preferable to use a polymer dopant, in view of suppressing dedoping of the dopant from the conductive polymer. Examples of the polymer dopant include anions of polyvinylsulfonic acid, polystyrenesulfonic acid, polyallyl sulfonic acid, polyacrylsulfonic acid, polymethacrylsulfonic acid, poly(2-acrylamido-2-methylpropanesulfonic acid), polyisoprene sulfonic acid, and polyacrylic acid. These polymer dopants may be used alone, or in combination of two or more thereof. These polymer dopants may be a homopolymer or may be a copolymer of two or more types of monomers. Particularly, polystyrenesulfonic acid (PSS) is preferred. The weight-average molecular weight of the polymer dopant is not particularly limited, but preferably ranges from 1,000 to 1,000,000, inclusive, for example, in terms of facilitating formation of a homogeneous solid electrolyte layer.

Hereinafter, the present disclosure will be described more specifically based on an exemplary embodiment. However, the following exemplary embodiment is not to limit the present disclosure.

Figure 2:
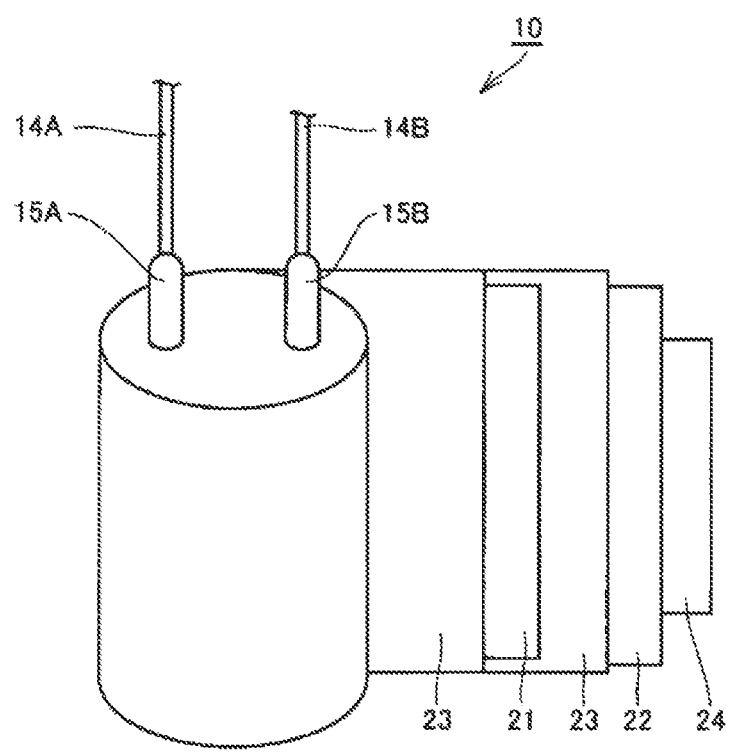
FIG. 2 is a schematic view illustrating a configuration of a capacitor element according to the present exemplary embodiment.

FIG. 1 is a cross-sectional schematic view of an electrolytic capacitor according to the present exemplary embodiment, and FIG. 2 is a schematic view in which a part of a capacitor element of the electrolytic capacitor is developed.

The electrolytic capacitor illustrated in FIG. 1 includes capacitor element 10, bottomed case 11 that houses capacitor element 10, sealing member 12 that closes an opening of bottomed case 11, and base plate 13 that covers sealing member 12. The electrolytic capacitor also includes lead wires 14A, 14B protruding from sealing member 12 to pass through base plate 13, lead tabs 15A, 15B connecting the lead wires to respective electrodes of capacitor element 10, and a liquid component (not illustrated). Bottomed case 11 is, at an opening end, curled to swage sealing member 12.

Capacitor element 10 is formed of a wound body as illustrated in FIG. 2. The wound body is a semi-finished product of capacitor element 10 in which a conductive polymer is not disposed between anode body 21 having a dielectric layer on its surface and cathode body 22. In the wound body, anode body 21 connected to lead tab 15A and cathode body 22 connected to lead tab 15B are wound with separator 23 being interposed between anode body 21 and cathode body 22. An outermost periphery of the wound body is fixed by winding stop tape 24. FIG. 2 illustrates the wound body that is partially developed before the outermost periphery of the wound body is fixed.

Anode body 21 includes a metal foil having a roughened surface and the dielectric layer is formed on the roughened surface. Capacitor element 10 is formed by attaching a conductive polymer to at least a part of a surface of the dielectric layer. Capacitor element 10 is housed in bottomed case 11 together with the liquid component (not illustrated).

Hereinafter, an example of a method of manufacturing an electrolytic capacitor will be described.
(i) Step of Preparing Anode Body Having Dielectric Layer and Cathode Body A metal foil made of a valve metal is used as a raw material for anode body 21 and cathode body 22. With regard to anode body 21, a surface of the metal foil is roughened by an etching process or the like, so that a plurality of recesses and projections are formed on the surface of the metal foil. Then, a dielectric layer is formed on the roughened surface of the metal foil by an anodizing treatment or the like. A surface of cathode body 22 may be roughened as necessary.
(ii) Step of Preparing Wound Body Anode body 21 and cathode body 22 are wound with separator 23 interposed between anode body 21 and cathode body 22 to prepare a wound body. A nonwoven fabric mainly made of synthetic cellulose may be used as separator 23. Winding stop tape 24 is disposed on an outer surface of cathode body 22 on an outermost layer of the wound body for the purpose of fixing an end of cathode body 22. If necessary, the anodizing treatment is further performed on the wound body.
(iii) Step of Forming Capacitor Element For example, the dielectric layer disposed on anode body 21 is impregnated with a liquid polymer dispersion so that a conductive polymer film is formed to cover at least a part of the dielectric layer. Consequently, capacitor element 10 in which the conductive polymer is disposed between anode body 21 and cathode body 22 is obtained. The step of applying the polymer dispersion on the surface of the dielectric layer may be repeated two or more times. Capacitor element 10 is then impregnated with a liquid component. It is thus possible to achieve an electrolytic capacitor including the conductive polymer and the liquid component.
(iv) Step of Encapsulating Capacitor Element Capacitor element 10 is housed in bottomed case 11 together with a liquid component so that lead wires 14A, 14B are positioned at a side close to an opening of bottomed case 11. Then, the opening of bottomed case 11 is closed by sealing member 12 so that the each of lead wires 14A, 14B pass through sealing member 12. An opening end of bottomed case 11 is curled to swage sealing member 12, and base plate 13 is disposed on a curled part of bottomed case 11. In this way, the electrolytic capacitor illustrated in FIG. 1 is completed.

A wound electrolytic capacitor has been described in the above exemplary embodiment. However, the application range of the present disclosure is not limited to the wound electrolytic capacitor and the present disclosure can also be applied to other electrolytic capacitors such as a chip electrolytic capacitor including a metal sintered body as an anode body and a stacked electrolytic capacitor including a metal plate as an anode body.

EXAMPLES

The present disclosure will be described in more detail with reference to an example. However, the present disclosure is not limited to the example.

In the following example, a wound electrolytic capacitor (Φ (diameter) 8.0 mm×L (length) 12.0 mm) having a rated voltage of 100 V and a rated electrostatic capacitance of 15 µF was produced. Hereinafter, a specific method of manufacturing an electrolytic capacitor will be described.
(Preparation of Anode Body)

A 100-µm-thick aluminum foil was subjected to etching to roughen a surface of the aluminum foil. A dielectric layer was then formed on the surface of the aluminum foil by an anodizing treatment. The anodizing treatment was performed by immersing the aluminum foil in an ammonium adipate solution and applying a voltage of 180 V to the aluminum foil. Thereafter, the aluminum foil was cut to prepare an anode body.
(Preparation of Cathode Body)

A 50-µm-thick aluminum foil was subjected to etching to roughen a surface of the aluminum foil. Thereafter, the aluminum foil was cut to prepare a cathode body.
(Production of Wound Body)

An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. Then, the produced wound body was subjected to an anodizing treatment again to form a dielectric layer at a cutting end of the anode body. Next, an end of an outer surface of the wound body was fixed by a winding stop tape, so that the wound body was produced.
(Preparation of Polymer Dispersion)

A mixed solution was prepared by mixing 3,4-ethylenedioxythiophene and a polymer dopant, i.e., polystyrenesulfonic acid (PSS, weight-average molecular weight 100,000) in ion-exchanged water. While the mixed solution was stirred, iron (III) sulfate (oxidant) that had been dissolved in ion-exchanged water was added to the mixed solution to cause a polymerization reaction. After the reaction, a resultant reaction solution was dialyzed to remove unreacted monomers and an excessive oxidant, so that a polymer dispersion that contained approximately 5% by mass of polyethylene dioxythiophene doped with PSS (PEDOT/PSS) was obtained.

(Formation of Solid Electrolyte Layer)

The wound body was immersed in the polymer dispersion housed in a predetermined container in a reduced-pressure atmosphere (40 kPa) for five minutes, and then the wound body was picked up from the polymer dispersion. Next, the wound body that had been impregnated with the polymer dispersion was dried in a drying furnace at 150° C. for 20 minutes to form a solid electrolyte layer including a conductive polymer layer covering at least part of the dielectric layer.

(Impregnation of Liquid Component)

Liquid components that contained an acid component, a base component, an aromatic additive, an aromatic compound having only an electron donating group, and various solvents as indicated in compositions represented by Tables 1 to 4 were prepared. A wound body was then immersed in each of the liquid components in a reduced-pressure atmosphere (40 kPa) for five minutes.

TABLE 1

| Content in liquid component | A1 | A2 | A3 | A4 | A5 | A6 | B1 |
|---|---|---|---|---|---|---|---|
| EG (% by mass) | 64.0 | 63.0 | 55.0 | 45.0 | 41.0 | 63.0 | 64.5 |
| PEG (% by mass) | 20.0 | 20.0 | 20.0 | 20.0 | 20.0 | 20.0 | 20.0 |
| Triethylamine (% by mass) | 2.0 | 2.0 | 2.0 | 2.0 | 2.0 | 2.0 | 2.0 |
| o-phthalic acid (% by mass) | 10.0 | 10.0 | 10.0 | 10.0 | 10.0 | 10.0 | 10.0 |
| Nitrophenol (% by mass) | 1.0 | 2.0 | 10.0 | 20.0 | 24.0 | 5.0 | 0.5 |
| Pyrogallol (% by mass) | 3.0 | 3.0 | 3.0 | 3.0 | 3.0 | — | 3.0 |
| Nitrophenol (parts by mass vs. 100 parts by mass of conductive polymer) | 50 | 100 | 500 | 1000 | 1200 | 250 | 25 |

EG: ethylene glycol
PEG: polyethylene glycol (weight-average molecular weight 300)

TABLE 2

| Content in liquid component | B2 | B3 | A7 | A8 | A9 | A10 | A11 | A12 |
|---|---|---|---|---|---|---|---|---|
| EG (% by mass) | 60.9 | 60.5 | 60.0 | 58.0 | 56.0 | 51.0 | 46.0 | 59.0 |
| PEG (% by mass) | 20.0 | 20.0 | 20.0 | 20.0 | 20.0 | 20.0 | 20.0 | 20.0 |
| Triethylamine (% by mass) | 0.1 | 0.5 | 1.0 | 3.0 | 5.0 | 10.0 | 15.0 | — |
| Dimethylamine (% by mass) | — | — | — | — | — | — | — | 2.0 |
| o phthalic acid (% by mass) | 10.0 | 10.0 | 10.0 | 10.0 | 10.0 | 10.0 | 10.0 | 10.0 |
| Nitrophenol (% by mass) | 6.0 | 6.0 | 6.0 | 6.0 | 6.0 | 6.0 | 6.0 | 6.0 |
| Pyrogallol (% by mass) | 3.0 | 3.0 | 3.0 | 3.0 | 3.0 | 3.0 | 3.0 | 3.0 |
| Nitrophenol (parts by mass vs. 100 parts by mass of conductive polymer) | 300 | 300 | 300 | 300 | 300 | 300 | 300 | 300 |

TABLE 3

| Content in liquid component | A13 | A14 | A15 | A16 | B4 | B5 |
|---|---|---|---|---|---|---|
| EG (% by mass) | 78.5 | 69.0 | 59.0 | 59.0 | 59.0 | 59.0 |
| PEG (% by mass) | 0.5 | 10.0 | 20.0 | 20.0 | 20.0 | 20.0 |
| Triethylamine (% by mass) | 2.0 | 2.0 | 2.0 | 2.0 | 2.0 | 2.0 |
| o-phthalic acid (% by mass) | 10.0 | 10.0 | 10.0 | 10.0 | 10.0 | 10.0 |
| Nitrophenol (% by mass) | 6.0 | 6.0 | 6.0 | — | — | — |
| Dinitrophenol (% by mass) | — | — | — | 6.0 | — | — |
| Dinitrobenzene (% by mass) | — | — | — | — | 6.0 | — |
| Nitrobenzoic acid (% by mass) | — | — | — | — | — | 6.0 |
| Pyrogallol (% by mass) | 3.0 | 3.0 | 3.0 | 3.0 | 3.0 | 3.0 |
| Nitrophenol (parts by mass vs. 100 parts by mass of conductive polymer) | 300 | 300 | 300 | | | |
| Dinitrophenol (parts by mass vs. 100 parts by mass of conductive polymer) | | | | 300 | | |
| Dinitrobenzene (parts by mass vs. 100 parts by mass of conductive polymer) | | | | | 300 | |
| Nitrobenzoic acid (parts by mass vs. 100 parts by mass of conductive polymer) | | | | | | 300 |

TABLE 4

| Content in liquid component | A17 | A18 | A19 | B6 |
|---|---|---|---|---|
| EG (% by mass) | 68.3 | 52.5 | 64.3 | 69.1 |
| PEG (% by mass) | 20.0 | 20.0 | 20.0 | 20.0 |
| Triethylamine (% by mass) | 1.8 | 5.0 | — | 2.0 |
| Dimethylamine (% by mass) | — | — | 1.4 | — |
| Borodisalicylic acid (% by mass) | 4.9 | 13.5 | 5.3 | 5.4 |
| Nitrophenol (% by mass) | 2.0 | 6.0 | 6.0 | 0.5 |
| Pyrogallol (% by mass) | 3.0 | 3.0 | 3.0 | 3.0 |
| Nitrophenol (parts by mass vs. 100 parts by mass of conductive polymer) | 50 | 100 | 100 | 25 |

(Encapsulation of Capacitor Element)

The capacitor element that had been impregnated with the liquid component was encapsulated to complete electrolytic capacitors (A1 to A19 and B1 to B6) as illustrated in FIG. 1. Thereafter, an aging treatment of applying the rated voltage was performed at 130° C. for two hours. Electrolytic capacitors A1 to A19 correspond to Examples 1 to 19, respectively, whereas electrolytic capacitors B1 to B6 correspond to Comparative Examples 1 to 6, respectively.

[Evaluation]

An electrostatic capacitance and an initial ESR were measured for the resultant electrolytic capacitors.

Next, in order to evaluate long-term reliability, each of the resultant electrolytic capacitors was held at 145° C. for 2,000 hours while applying the rated voltage to each of the resultant electrolytic capacitors. An increase rate of ESR ($\Delta$ESR) was then measured. $\Delta$ESR was represented as a ratio ($X/X_0$) of ESR(X) after holding at 145° C. to initial value ($X_0$). Table 5 shows evaluation results.

TABLE 5

| Electrolytic capacitor | Electrostatic capacity (μF) | Initial ESR (Ω) | X/Xo |
|---|---|---|---|
| A1 | 15.2 | 0.012 | 2.1 |
| A2 | 15.1 | 0.012 | 1.9 |
| A3 | 15.2 | 0.011 | 1.8 |
| A4 | 15.2 | 0.011 | 1.5 |
| A5 | 15.3 | 0.010 | 1.3 |
| A6 | 15.2 | 0.012 | 1.9 |
| A7 | 14.8 | 0.011 | 1.2 |

TABLE 5-continued

| Electrolytic capacitor | Electrostatic capacity (μF) | Initial ESR (Ω) | X/Xo |
|---|---|---|---|
| A8 | 15.0 | 0.011 | 1.3 |
| A9 | 15.1 | 0.011 | 1.4 |
| A10 | 15.1 | 0.014 | 1.7 |
| A11 | 15.3 | 0.014 | 1.9 |
| A12 | 15.1 | 0.011 | 1.2 |
| A13 | 15.2 | 0.010 | 1.9 |
| A14 | 15.3 | 0.011 | 1.6 |
| A15 | 15.2 | 0.012 | 1.3 |
| A16 | 15.2 | 0.010 | 1.2 |
| A17 | 15.1 | 0.010 | 1.2 |
| A18 | 15.3 | 0.012 | 1.4 |
| A19 | 15.3 | 0.011 | 1.2 |
| B1 | 15.2 | 0.013 | 2.9 |
| B2 | 10.8 | 0.010 | 1.3 |
| B3 | 12.4 | 0.011 | 1.3 |
| B4 | 15.3 | 0.015 | 3.3 |
| B5 | 15.2 | 0.014 | 2.7 |
| B6 | 15.2 | 0.013 | 2.3 |

The present disclosure is useful for an electrolytic capacitor having a conductive polymer and a liquid component.

What is claimed is:

1. An electrolytic capacitor comprising:
an anode body including a dielectric layer;
a cathode body; and
a conductive polymer and a liquid component that are disposed between the anode body and the cathode body, wherein:
the liquid component contains an acid component and an aromatic additive,
the acid component includes at least one of an aromatic carboxylic acid and an aromatic carboxylic acid derivative,
the at least one of the aromatic carboxylic acid and the aromatic carboxylic acid derivative includes at least two carboxy groups and at least one aromatic ring, the aromatic additive includes an electron withdrawing group and an electron donating group, and
a content ratio of the aromatic additive contained in the liquid component is more than or equal to 50 parts by mass with respect to 100 parts by mass of the conductive polymer.

2. The electrolytic capacitor according to claim 1, wherein a content proportion of the aromatic additive in the liquid component is more than or equal to 1% by mass.

3. The electrolytic capacitor according to claim 1, wherein the liquid component further contains a polymer solvent.

4. The electrolytic capacitor according to claim 3, wherein a content proportion of the polymer solvent in the liquid component is more than or equal to 0.5% by mass.

5. The electrolytic capacitor according to claim 1, wherein the aromatic carboxylic acid is a phthalic acid.

6. The electrolytic capacitor according to claim 1, wherein the aromatic carboxylic acid derivative is at least one selected from the group consisting of a borodisalicylic acid, a borodiglycolic acid, and a borodioxalic acid.

7. The electrolytic capacitor according to claim 1, wherein the electron withdrawing group is at least one selected from the group consisting of a nitro group, a carboxy group, a phenyl group, an acyl group, a tosyl group, a keto group, a cyano group, a methylsulfonyl group, and a halogen group.

8. The electrolytic capacitor according to claim 1, wherein the electron donating group is at least one selected from the group consisting of a hydroxy group, an amino group, an alkyl group, an alkoxy group, and an ester group.

9. The electrolytic capacitor according to claim 1, wherein the aromatic additive is at least one selected from the group consisting of (p-, m-, o-) nitrophenol, dinitrophenol, trinitrophenol, (p-, m-, o-) hydroxybenzenecarboxylic acid, dihydroxybenzenecarboxylic acid, (p-, m-, o-) acetylphenol, (p-, m-, o-) benzoylphenol, and (p-, m-, o-) methylsulfonylphenol.

\* \* \* \* \*